US009588673B2

(12) United States Patent
Van Ieperen et al.

(10) Patent No.: US 9,588,673 B2
(45) Date of Patent: Mar. 7, 2017

(54) METHOD FOR MANIPULATING A GRAPHICAL OBJECT AND AN INTERACTIVE INPUT SYSTEM EMPLOYING THE SAME

(75) Inventors: Taco Van Ieperen, Calgary (CA); Douglas Blair Hill, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 0 days.

(21) Appl. No.: 13/436,832

(22) Filed: Mar. 30, 2012

(65) Prior Publication Data

US 2012/0254782 A1    Oct. 4, 2012

Related U.S. Application Data

(60) Provisional application No. 61/470,420, filed on Mar. 31, 2011.

(51) Int. Cl.
*G06F 3/048* (2013.01)
*G06F 3/0488* (2013.01)
*G06F 3/0486* (2013.01)

(52) U.S. Cl.
CPC ........ *G06F 3/04883* (2013.01); *G06F 3/0486* (2013.01)

(58) Field of Classification Search
USPC .................................. 715/765, 853; 345/619
See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,353,436 B1* | 3/2002 | Reichlen | 345/427 |
| 6,747,636 B2 | 6/2004 | Martin | |
| 6,803,906 B1 | 10/2004 | Morrison et al. | |
| 7,030,861 B1 | 4/2006 | Westerman et al. | |
| 7,232,986 B2 | 6/2007 | Worthington et al. | |
| 7,236,162 B2 | 6/2007 | Morrison et al. | |
| 7,242,389 B1* | 7/2007 | Stern | 345/158 |

(Continued)

FOREIGN PATENT DOCUMENTS

| | | |
|---|---|---|
| GB | 2 451 274 A | 1/2009 |
| WO | 2009/060454 A2 | 5/2009 |
| WO | 2009/126710 A2 | 10/2009 |

OTHER PUBLICATIONS

Transmittal; International Search Report; and Written Opinion of the International Searching Authority for International Application No. PCT/CA2012/000303 with a mailing date of Jul. 18, 2012.

(Continued)

*Primary Examiner* — Linh K Pham
*Assistant Examiner* — Wendy Nicholas
(74) *Attorney, Agent, or Firm* — Perkins Coie LLP

(57) ABSTRACT

A method comprises receiving an input event generated when at least one contact is made on an interactive surface at a location corresponding to a graphical object; determining the number of contacts associated with the input event; tracking movement of the at least one contact on the interactive surface; identifying a graphical object manipulation based on the number of contacts, the movement of the at least one contact, and the graphical object type; and performing the graphical object manipulation.

33 Claims, 11 Drawing Sheets

(56) References Cited

U.S. PATENT DOCUMENTS

| | | |
|---|---|---|
| 7,274,356 B2 | 9/2007 | Ung et al. |
| 7,479,949 B2 * | 1/2009 | Jobs .................. G06F 3/0488 345/169 |
| 7,532,206 B2 | 5/2009 | Morrison et al. |
| 7,757,186 B2 * | 7/2010 | Fabrick, II .................... 715/862 |
| 7,864,163 B2 * | 1/2011 | Ording et al. ................ 345/173 |
| 8,276,095 B2 * | 9/2012 | Cutler et al. ................... 715/804 |
| 8,356,258 B2 * | 1/2013 | Matthews et al. ............ 715/788 |
| 2004/0179001 A1 | 9/2004 | Morrison et al. |
| 2004/0201628 A1 * | 10/2004 | Johanson et al. ............. 345/764 |
| 2005/0052427 A1 | 3/2005 | Wu et al. |
| 2005/0259084 A1 | 11/2005 | Popovich et al. |
| 2007/0152984 A1 | 7/2007 | Ording et al. |
| 2007/0283285 A1 * | 12/2007 | Buchmann ............ G06F 3/1423 715/764 |
| 2008/0082920 A1 * | 4/2008 | Eom .................. G06F 3/04886 715/702 |
| 2009/0058830 A1 * | 3/2009 | Herz et al. .................... 345/173 |
| 2010/0017745 A1 * | 1/2010 | Kikuchi et al. ............... 715/781 |
| 2010/0079405 A1 * | 4/2010 | Bernstein ....................... 345/174 |
| 2010/0093399 A1 * | 4/2010 | Kim et al. ..................... 455/566 |
| 2010/0123734 A1 * | 5/2010 | Ozawa et al. ................ 345/619 |
| 2010/0318921 A1 * | 12/2010 | Trachtenberg et al. ....... 715/751 |
| 2010/0328191 A1 * | 12/2010 | Smith et al. ................... 345/1.3 |
| 2011/0006981 A1 | 1/2011 | Chtchetinine |
| 2011/0043480 A1 | 2/2011 | Popovich et al. |
| 2011/0078560 A1 * | 3/2011 | Weeldreyer ........... G06F 17/214 715/255 |
| 2011/0154268 A1 * | 6/2011 | Trent, Jr. ............ G06F 3/04883 715/863 |
| 2011/0169736 A1 | 7/2011 | Bolt et al. |
| 2011/0199387 A1 * | 8/2011 | Newton .................. G06F 3/017 345/619 |
| 2012/0030624 A1 * | 2/2012 | Migos .................. G06F 3/0482 715/830 |
| 2012/0139951 A1 * | 6/2012 | Hwang ............... G06F 3/04883 345/665 |
| 2012/0182203 A1 * | 7/2012 | Yoshikawa ........... G06F 3/1423 345/1.3 |

OTHER PUBLICATIONS

Extended European Search Report for European Patent Application No. 12 765 904.3 with a mailing date of Sep. 19, 2014.

* cited by examiner

METHOD FOR MANIPULATING A GRAPHICAL OBJECT AND AN INTERACTIVE INPUT SYSTEM EMPLOYING THE SAME

CROSS-REFERENCE TO RELATED APPLICATIONS

This application claims the benefit of U.S. Provisional Application No. 61/470,420 to Van Ieperen, et al., filed on Mar. 31, 2011, entitled "METHOD FOR MANIPULATING A GRAPHICAL OBJECT AND AN INTERACTIVE INPUT SYSTEM EMPLOYING THE SAME", the content of which is incorporated herein by reference in its entirety.

FIELD OF THE INVENTION

The present invention relates generally to interactive input systems, and in particular, to a method for manipulating a graphical object and an interactive input system employing the same.

BACKGROUND OF THE INVENTION

Interactive input systems that allow users to inject input such as for example digital ink, mouse events, etc., into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

In some environments, interactive input systems are networked with one or more computers, other interactive input systems and/or other network enabled devices. In addition to interactive presentations, networked interactive input systems enable collaborations among participants situated in geographically disparate locations.

During interactive presentations, a presenter typically uses a pointer (e.g., a finger, pen tool or other suitable object) to create, select and manipulate displayed graphical objects on an interactive surface or whiteboard. The user may add annotations, change colors or fill patterns of displayed graphical objects, or may move, rotate, enlarge, reduce and generally manipulate displayed graphical objects using gestures.

Unfortunately, it is often difficult to determine the intended image processing operation during user pointer interaction with a displayed graphical object. Unlike keyboard or keypad based inputs, pointer-based inputs are often susceptible to ambiguous interpretation. The ability of users to correctly communicate intent, regarding the desired manipulation of displayed graphical objects is therefore somewhat limited in some interactive input systems.

It is therefore an object to provide a novel method for manipulating a graphical object and a novel interactive input system employing the same.

SUMMARY OF THE INVENTION

Accordingly, in one aspect there is provided a method comprising receiving an input event generated when at least one contact is made on an interactive surface at a location corresponding to a graphical object; determining the number of contacts associated with the input event; tracking movement of the at least one contact on the interactive surface; identifying a graphical object manipulation based on the number of contacts, the movement of the at least one contact, and the graphical object type; and performing the graphical object manipulation.

In one embodiment, the at least one contact is made by at least one finger. The identifying comprises examining a lookup table to identify the graphical object manipulation. The lookup table may be customizable by a user.

In one embodiment, the graphical object type is one of a computer program icon, an image, and a window. When the graphical object type is the computer program icon, the graphical object manipulation is one of a graphical object moving manipulation and a graphical object copy and paste manipulation. When the graphical object type is the image, the graphical object manipulation is one of a graphical object moving manipulation, a graphical object moving with snap manipulation, a graphical object moving with resizing manipulation, a graphical object copy and paste manipulation, a graphical object resizing manipulation, a graphical object maximizing manipulation, a graphical object minimizing manipulation, a graphical object cropping manipulation, a graphical object rotating manipulation, a graphical object selecting manipulation and a graphical object deleting manipulation. When the graphical object type is the window, the graphical object manipulation is one of a graphical object moving manipulation, a graphical object resizing manipulation, a graphical object maximizing manipulation, a graphical object minimizing manipulation and a graphical object closing manipulation.

According to another aspect there is provided an interactive input system comprising an interactive surface; and processing structure for receiving an input event generated when at least one contact is made on the interactive surface at a location corresponding to a graphical object displayed on said interactive surface, in response to said input event, said processing structure being configured to determine a number of contacts associated with the input event, track movement of the at least one contact on the interactive surface, identify a graphical object manipulation based on the number of contacts, the movement of the at least one contact, and the graphical object type, and perform the graphical object manipulation.

According to another aspect there is provided a non-transitory computer readable medium embodying a computer program for execution by a computer, the computer program comprising program code for receiving an input event generated when at least one contact is made on an interactive surface at a location corresponding to a graphical object; program code for determining the number of contacts associated with the input event; program code for tracking movement of the at least one contact on the interactive surface; program code for identifying a graphical object manipulation based on the number of contacts, the movement of the at least one contact, and the graphical object type; and program code for performing the graphical object manipulation.

BRIEF DESCRIPTION OF THE DRAWINGS

Embodiments will now be described more fully with reference to the accompanying drawings in which.

DETAILED DESCRIPTION OF THE EMBODIMENTS

In the following, a method and system are described wherein the method comprises receiving an input event in the event that at least one contact is made on an interactive surface at a location corresponding to a graphical object displayed thereon, determining the number of contacts associated with the input event, tracking movement of the at least one contact on the interactive surface, identifying a manipulation operation based at least on the determined number of contacts and the tracked movement of the at least one contact, and performing the identified manipulation operation on the displayed graphical object.

Figure 1:
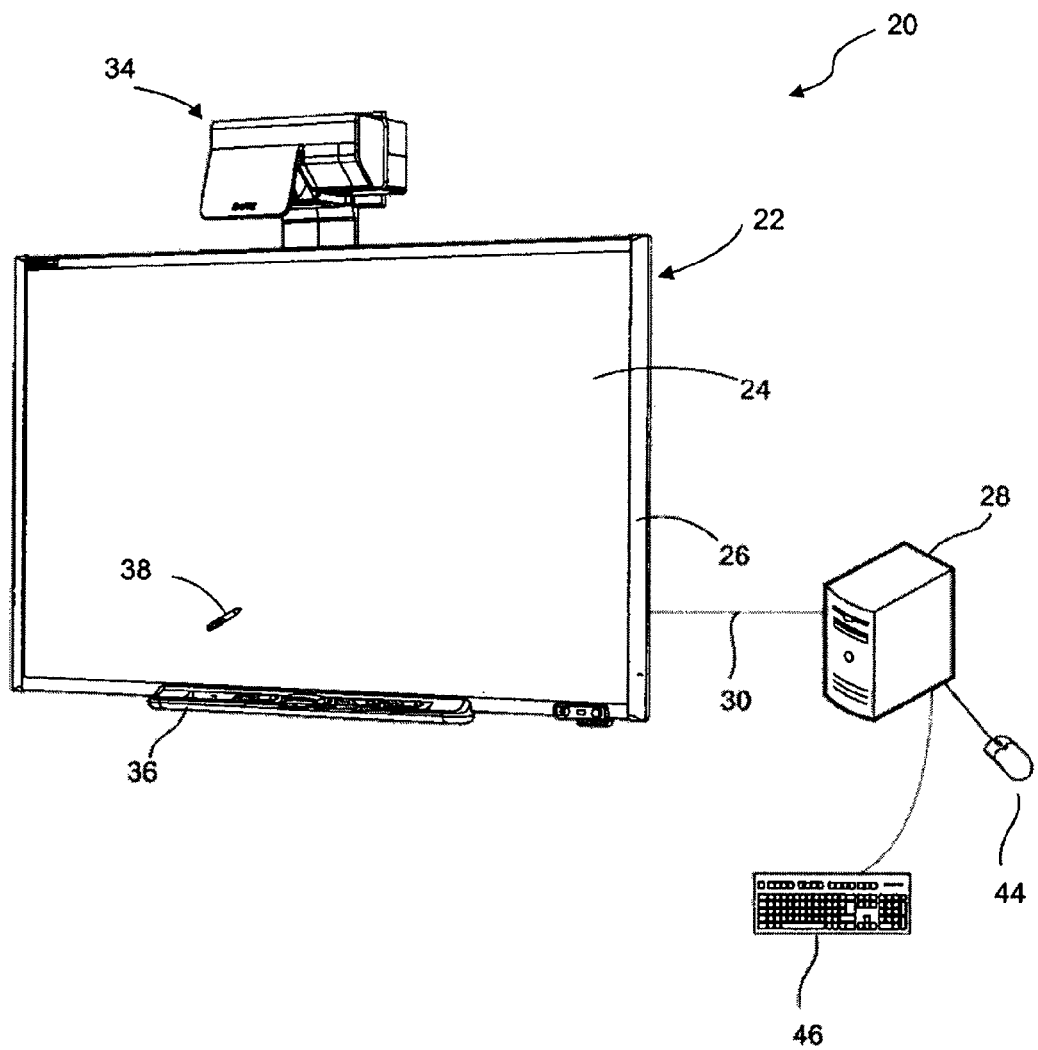
FIG. 1 is a perspective view of an interactive input system.

Turning now to FIG. 1, an interactive input system is shown and is generally identified by reference numeral 20. Interactive input system 20 allows one or more users to inject input such as digital ink, mouse events, commands, etc., into an executing application program. In this embodiment, interactive input system 20 comprises a two-dimensional (2D) interactive device in the form of an interactive whiteboard (IWB) 22 mounted on a vertical support surface such as for example, a wall surface or the like. IWB 22 comprises a generally planar, rectangular interactive surface 24 that is surrounded about its periphery by a bezel 26. An ultra-short-throw projector 34, such as that sold by SMART Technologies ULC under the name "SMART UX60", is also mounted on the support surface above the IWB 22 and projects an image, such as for example, a computer desktop, onto the interactive surface 24.

The IWB 22 employs machine vision to detect one or more pointers brought into a region of interest in proximity with the interactive surface 24. The IWB 22 communicates with a general purpose computing device 28 executing one or more application programs via a universal serial bus (USB) cable 30 or other suitable wired or wireless communication link. General purpose computing device 28 processes the output of the IWB 22 and adjusts image data that is output to the projector 34, if required, so that the image presented on the interactive surface 24 reflects pointer activity. In this manner, the IWB 22, general purpose computing device 28 and projector 34 allow pointer activity proximate to the interactive surface 24 to be recorded as writing or drawing or used to control execution of one or more application programs executed by the general purpose computing device 28.

The bezel 26 is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 24.

A tool tray 36 is affixed to the IWB 22 adjacent the bottom bezel segment using suitable fasteners such as for example, screws, clips, adhesive, etc. As can be seen, the tool tray 36 comprises a housing having an upper surface configured to define a plurality of receptacles or slots. The receptacles are sized to receive one or more pen tools 38 as well as an eraser tool that can be used to interact with the interactive surface 24. Control buttons are also provided on the upper surface of the tool tray housing to enable a user to control operation of the interactive input system 20. Further specifies of the tool tray 36 are described in International PCT Application Publication No. WO 2011/085486 filed on Jan. 13, 2011, and entitled "INTERACTIVE INPUT SYSTEM AND TOOL TRAY THEREFOR".

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes IR illumination and appears as a dark region interrupting the bright band in captured image frames.

The imaging assemblies are oriented so that their fields of view overlap and look generally across the entire interactive surface 24. In this manner, any pointer such as for example a user's finger, a cylinder or other suitable object, a pen tool 38 or an eraser tool lifted from a receptacle of the tool tray 36, that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the general purpose computing device 28.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.), and a system bus coupling the various computer components to the processing unit. The general purpose computing device 28 may also comprise networking capabilities using Ethernet, WiFi, and/or other suitable network format, to enable connection to shared or remote drives, one or more networked computers, or other networked devices. A mouse 44 and a keyboard 46 are coupled to the general purpose computing device 28.

The general purpose computing device 28 processes pointer data received from the imaging assemblies to resolve pointer ambiguity by combining the pointer data generated by the imaging assemblies, and to compute the locations of pointers proximate the interactive surface 24 using well known triangulation. The computed pointer locations are then recorded as writing or drawing or used an input command to control execution of an application program as described above.

In addition to computing the locations of pointers proximate to the interactive surface 24, the general purpose computing device 28 also determines the pointer types (e.g., pen tool, finger or palm) by using pointer type data received from the IWB 22. The pointer type data is generated for each pointer contact by the DSP of at least one of the imaging assemblies by differentiating a curve of growth derived from a horizontal intensity profile of pixels corresponding to each pointer tip in captured image frames. Specifics of methods used to determine pointer type are disclosed in U.S. Pat. No. 7,532,206 to Morrison, et al., and assigned to SMART Technologies ULC, the content of which is incorporated herein by reference in its entirety.

Figure 2:
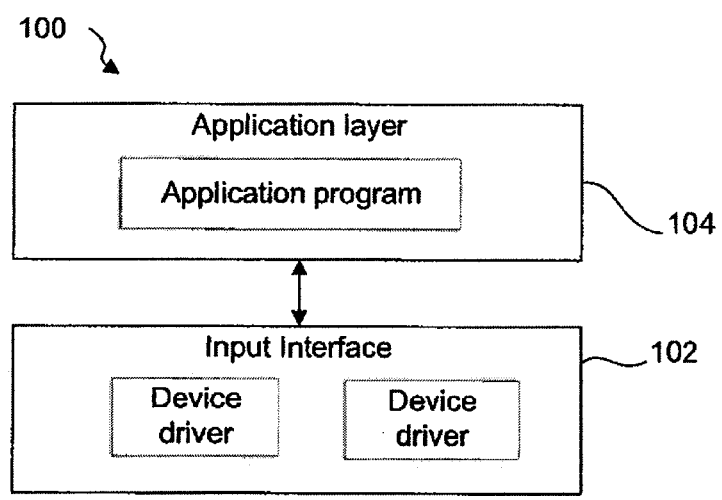
FIG. 2 is a simplified block diagram of the software architecture of the interactive input system of FIG. 1.

FIG. 2 shows exemplary software architecture used by the interactive input system 20, and which is generally identified by reference numeral 100. The software architecture 100 comprises an input interface 102, and an application layer comprising an application program 104. The input interface 102 is configured to receive input from various input sources generated from the input devices of the interactive input system 20. In this embodiment, the input devices include the IWB 22, the mouse 44, and the keyboard 46. The input interface 102 processes each input received to generate an input event.

In generating each input event, the input interface 102 detects the identity of the received input based on input characteristics. Input interface 102 assigns to each input event, an input ID, a surface ID and a contact ID as depicted in Table 1 below.

TABLE 1

| Input Source | IDs of Input Event |
|---|---|
| Keyboard | {input ID, NULL, NULL} |
| Mouse | {input ID, NULL, NULL} |
| Pointer contact on IWB | {input ID, surface ID, contact ID} |

In this embodiment, if received input is not pointer input originating from the IWB 22, the values of the surface ID and the contact ID are set to NULL.

The input ID identifies the input source. If the received input originates from an input device such as mouse 44 or keyboard 46, the input ID identifies that input device. If the received input is pointer input originating from the IWB 22, the input ID identifies the type of pointer, such as for example a pen tool, a finger or a palm.

The surface ID identifies the interactive surface on which the pointer input is received. In this embodiment, IWB 22 comprises only a single interactive surface 24, and therefore the value of the surface ID is the identity of the interactive surface 24.

The contact ID is used to distinguish between multiple simultaneous contacts made by the same type of pointer on interactive surface 24. Contact IDs identify how many pointers are used, and permit tracking of each pointer's individual movement.

As one or more pointers contact the interactive surface 24 of the IWB 22, associated input events are generated. The input events are generated from the time the one or more pointers contact the interactive surface 24 (referred to as a contact down event) until the time the one or more pointers are lifted out of contact with the interactive surface 24 (referred to as a contact up event). As will be appreciated, a contact down event is similar to a mouse down event in a typical graphical user interface utilizing mouse input, wherein a user presses and holds one of the mouse buttons. Similarly, a contact up event is similar to a mouse up event in a typical graphical user interface utilizing mouse input, wherein a user releases the pressed mouse button.

The generated input events are received by input interface 102 and are processed to retrieve the associated IDs (input IDs, surface IDs and contact IDs). When an input event is received by the input interface 102, the input interface 102 communicates the input event and the associated IDs to the application program 104. The input event is in turn processed by the application program 104 based on the number of contact IDs associated therewith, as will now be explained.

An exemplary method will now be described for manipulating a graphical object based on the number of contact IDs received by the input interface 102, wherein each contact is a finger contacting the interactive surface 24. As will be appreciated, a graphical object is an object displayed on the interactive surface 24 such as for example a computer program icon, a computer program directory icon used in file explorers, a computer program shortcut icon, an image, a bitmap image, a JPEG image, a GIF image, a window associated with a computer program, a visual user interface element associated with data, a digital ink object associated with a computer program application such as SMART Notebook™, Bridgit™ and MeetingPro™ from SMART Technologies ULC, a portable document format (PDF) annotation, an application program window such as that associated with a word processor, a spreadsheet, an email client, a drawing package, embeddable objects such as shapes, lines, text boxes, diagrams, chart, animation objects such as Flash™, Java™ applets, 3D-models, etc.

Different types of graphical objects may be manipulated in different ways. For example, typical manipulations of a computer program icon comprise copying, or moving the computer program icon to different locations on a computer desktop. As will be appreciated, a computer program icon is typically never resized or rotated via manipulation. An image may be resized, zoomed into, zoomed out of, copied, rotated, etc. A window associated with a computer program may be moved, maximized to fit the entire viewing area of the interactive surface 24, or minimized to a toolbar on the home screen of a computer desktop. The subject graphical object manipulation method allows for manipulation of a graphical object based on the number of fingers in contact with the interactive surface 24. As will become apparent, similar or identical input events made on the interactive surface 24 may be processed to manipulate different graphical objects in different ways.

Figure 3A:
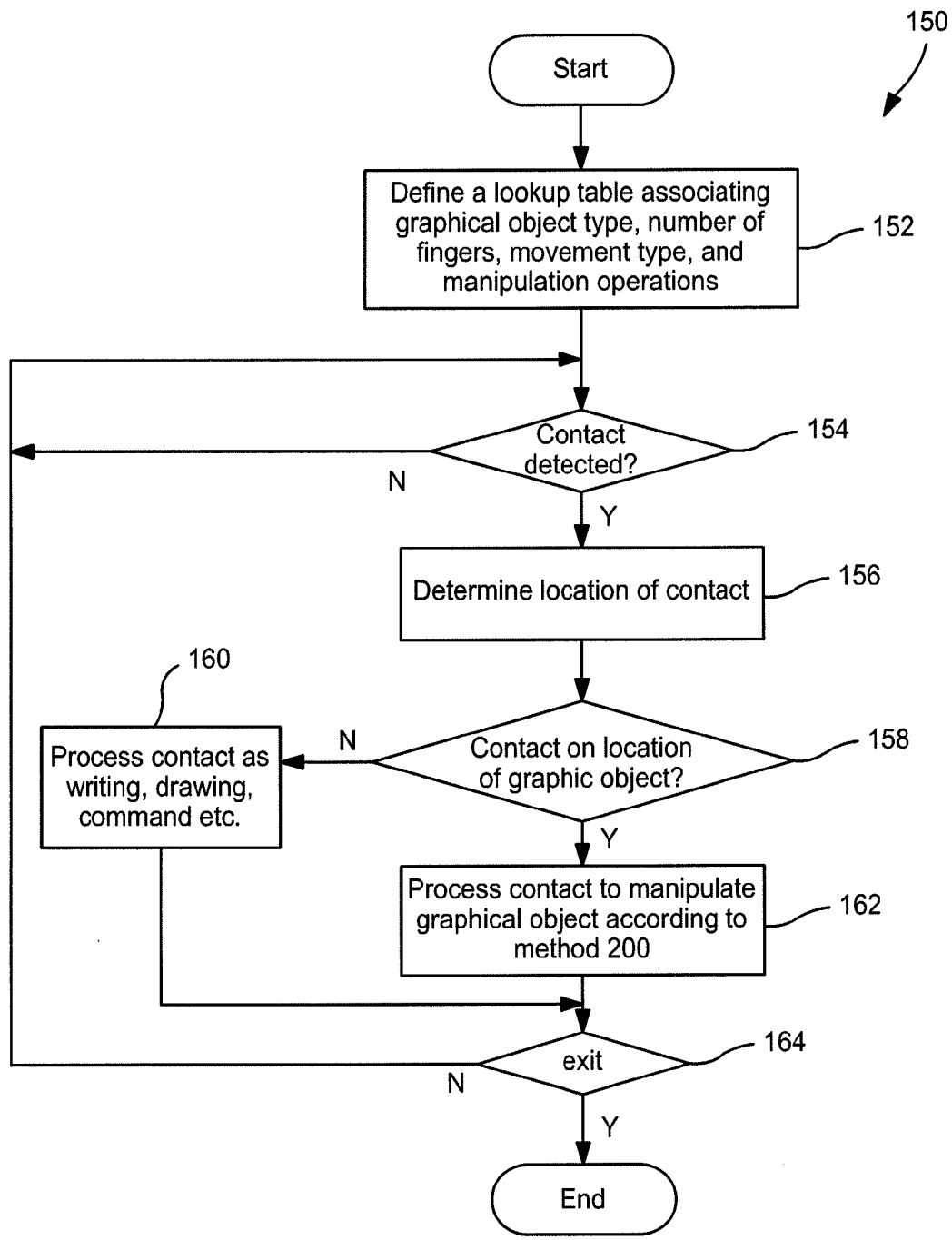
FIGS. 3A and 3B are flowcharts showing steps of a graphical object manipulation method based on the number of fingers in contact with an interactive surface of the interactive input system of FIG. 1.

Turning to FIG. 3A, the graphical object manipulation method executed by the general purpose computing device 28 of interactive input system 20 is shown and is generally identified by reference numeral 150. At the start of method 150, a lookup table is defined (hereinafter referred to as a predefined lookup table, shown below as Table 2) that associates graphical object types, the number of fingers and the movements of the finger(s) with graphical object manipulations to be performed (step 152). The predefined lookup table in this embodiment is configured or customized manually by a user.

TABLE 2

| No. of fingers | Object Type | Movement Type | Manipulation Operation |
|---|---|---|---|
| 1 | Image | Drag with one finger to a target location | Move and scale to snap to grid. |
| 2 | Image | Drag with both fingers | Move to target location only |
| 2 | Image | Fingers move away from each other | Zoom in at the same location |
| 2 | Image | Fingers move towards each other | Zoom out at the same location |
| 1 | Computer program icon | Drag with one finger | Copy and Paste at target location. |
| 2 | Computer program icon | Drag with both fingers | Move to target location |

Once the lookup table has been defined, the method 150 remains idle until a contact is detected. In the event a contact is detected on the interactive surface 24 (step 154), the location of the contact on the interactive surface 24 is determined, as described above (step 156). A check is then performed to determine if the contact has been made at the location of a graphical object (step 158). In the event the contact has not been made at the location of a graphical object, the contact is processed as writing or drawing or used to control the execution of one or more application programs executed by the general purpose computing device 28 as described above (step 160). In the event the contact has been made at the location of a graphical object, the contact is processed to manipulate the graphical object according to method 200 as will be described (step 162). Once the detected contact has been processed according to step 160 or 162, a check is made to determine if an exit condition has been detected (step 164). If no exit condition has been detected, the method 150 returns to step 154 until a new contact is detected. At step 164, if an exit condition has been detected, method 150 is terminated.

Figure 3B:
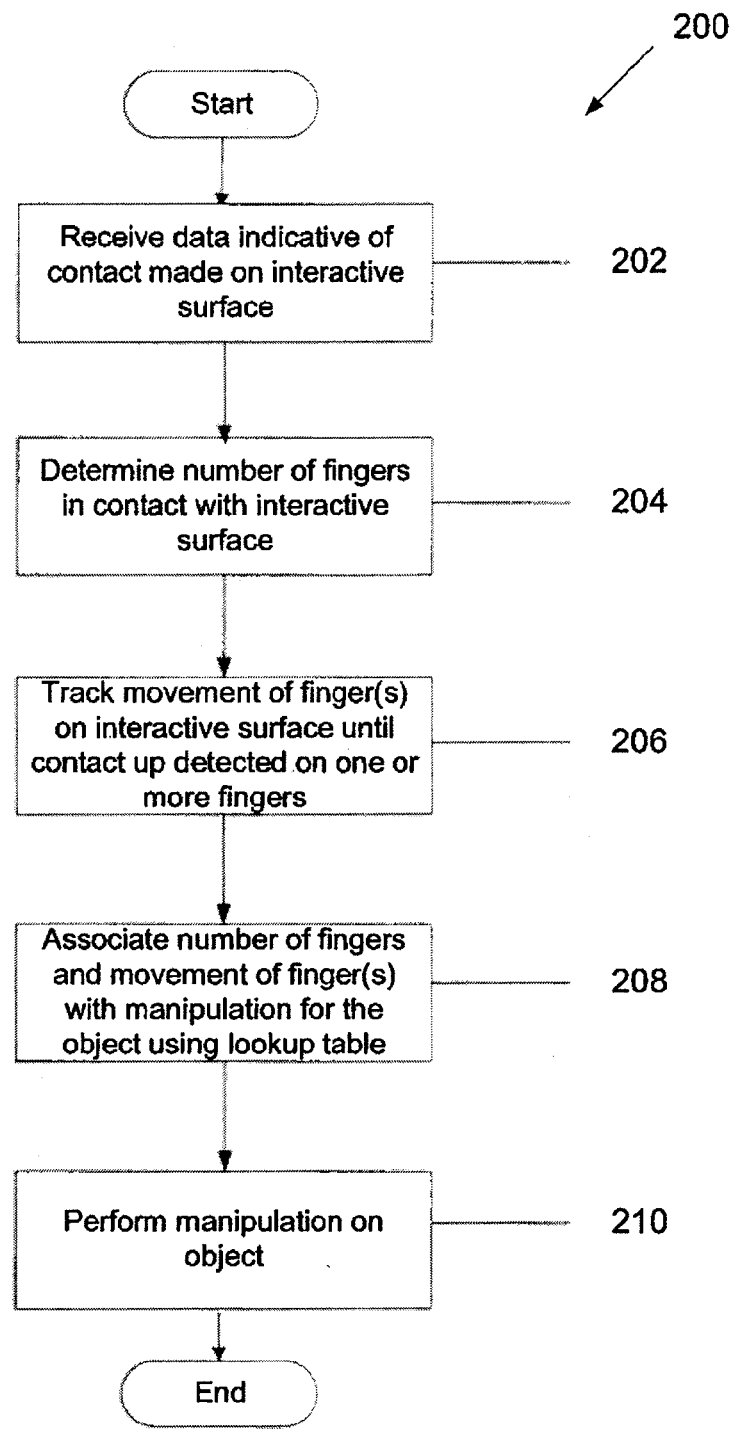

Turning now to FIG. 3B, method 200 for manipulating the graphical object that has been contacted based on the number of fingers in contact with the interactive surface 24 is shown. Initially, the data associated with the contact that resulted in method 200 being carried out is obtained (step 202). The number of fingers in contact with the interactive surface 24 is then determined (step 204). The movement of the finger(s) is tracked on the interactive surface 24, until a contact up event associated with one or more of the fingers is detected (step 206). Using the predefined lookup table shown in Table 2, the number of fingers, the movement of the finger(s) and the type of the graphical object that has been contacted are used to determine the graphical object manipulation that is to be performed (step 208). The determined graphical object manipulation is then performed on the graphical object (step 210) and process proceeds to steps 164.

As mentioned previously, graphical objects may be in the form of an image. A typical manipulation of an image involves moving the image from one location to another. As one skilled in the art will appreciate, when an image is moved on a computer desktop or within a computer program, the final location of the image may be automatically adjusted ("snapped") such that it lines up (vertically and/or horizontally) with neighboring objects. Sometimes this is helpful to the user, but at other times it is not desired. An example of using method 200 to move an image with or without snapping will now be described.

Figure 4A:
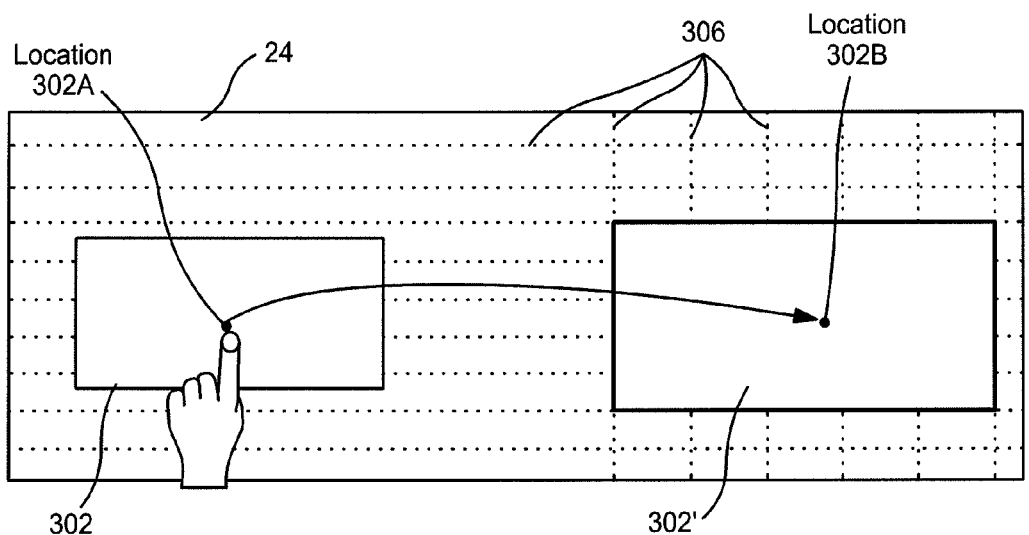
FIGS. 4A and 4B show an example of manipulating a displayed image using a single finger, and two fingers, respectively, in contact with the interactive surface of the interactive input system of FIG. 1.

FIG. 4A illustrates an example of manipulating an image 302 displayed on interactive surface 24 using a single finger in contact with the interactive surface 24 according to method 200. As can be seen, a contact is made on the interactive surface 24 at location 302A on image 302 using a finger (step 202). In this case, the number of fingers in contact with the interactive surface 24 is determined to be one (1) (step 204). The movement of the finger is tracked on the interactive surface 24 until a contact up event is detected, as illustrated by the movement of the finger from location 302A to location 302B (step 206). The single finger, the movement of the finger from location of 302A to location of 302B and the type of graphical object contacted (an image), are used to determine the associated graphical object manipulation from the predefined lookup table. In this example, the graphical objection manipulation corresponds to a graphical object move with snap to a grid operation, the grid being identified by reference numeral 306 (step 208). The graphical object manipulation is then performed on image 302, and the image 302 is moved from location 302A and snapped to a grid location corresponding to location 302B, as identified by image 302' in FIG. 4A (step 210). Image 302' is scaled such that the boundaries of image 302' are aligned with grid 306. As can be seen, image 302' is larger than image 302. As will be appreciated, in other embodiments the area of image 302' may be smaller than image 302.

Figure 4B:
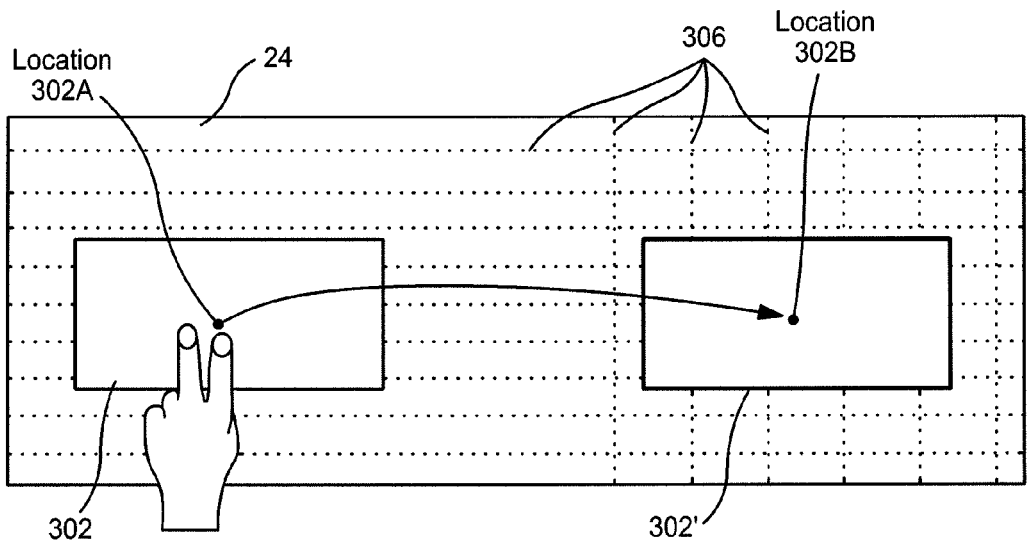

FIG. 4B illustrates an example of manipulating an image 302 displayed on the interactive surface 24 using two fingers in contact with the interactive surface 24 according to method 200. As can be seen, a contact is made on the interactive surface 24 at location 302A of image 302 (step 202). In this case, the number of fingers in contact with the interactive surface 24 is determined to be two (2) (step 204). The movement of each finger is tracked on the interactive surface 24 until a contact up event is detected, as illustrated by the movement of the fingers from location 302A to location 302C (step 206). The two fingers, the movement of the fingers from location 302A to location 302C and the type of graphical object contacted (an image), are used to determine the associated graphical object manipulation from the predefined lookup table. In this example, the graphical object manipulation corresponds to a graphical object move to target location only operation, that is, moving the graphical object without snap to a grid. The graphical object manipulation is then performed on image 302, and the image 302 is moved from location 302A to location 302C, as identified by image 302' in FIG. 4B (step 210). As can be seen, image 302' is the same size as image 302.

As mentioned previously, a graphical object may be in the form of a computer program icon. A typical manipulation of a computer program icon involves moving the computer program icon from a first location to a second location. Another typical manipulation of a computer program icon is copy and paste, where the computer program icon is copied from a first location and pasted to a second location. As one skilled in the art will appreciate, when a computer program icon is selected and moved from a first location to a second location on a computer desktop or within a computer program, the computer program icon is automatically moved from the first to the second location. Sometimes this is helpful, but at other times it may be desirable to automatically copy the computer program icon when selected at the first location, and paste the copied computer program icon to the second location. An example of using method 200 to move a computer program icon and to copy and paste a computer program icon will now be described.

Figure 5A:
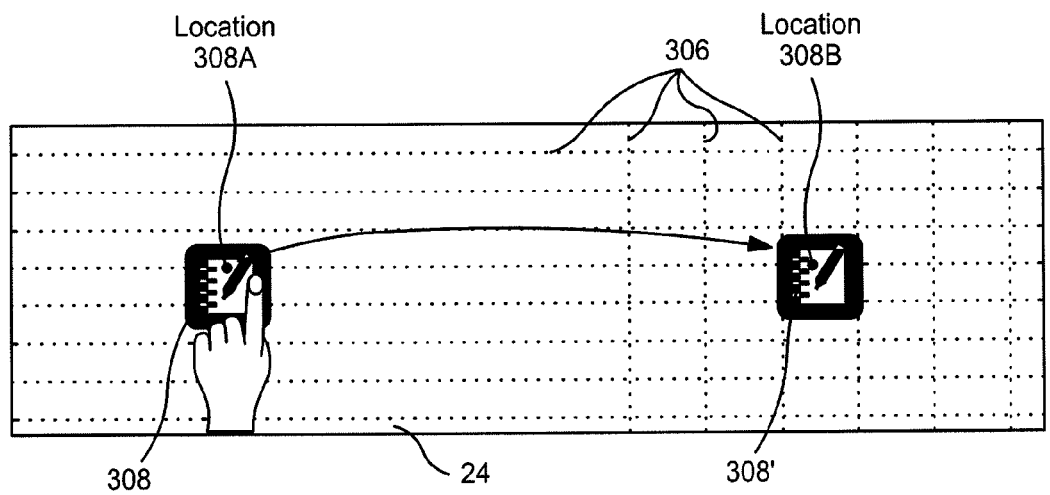
FIGS. 5A and 5B show an example of manipulating a displayed computer program icon using a single finger, and two fingers, respectively, in contact with the interactive surface of the interactive input system of FIG. 1.

FIG. 5A illustrates an example of manipulating a computer program icon 308 displayed on the interactive surface 24 based on a single finger in contact with the interactive surface 24 according to method 200. As can be seen, a contact is made on the interactive surface 24 at the location of icon 308, identified as location 308A (step 202). In this case, the number of fingers in contact with the interactive surface 24 is determined to be one (1) (step 204). The movement of the finger is tracked on the interactive surface 24, as illustrated by the movement of the finger from location 308A to location 308B (step 206). The single finger, the movement of the finger from location 308A to location of 308B and the type of graphical object contacted (a computer program icon), are used to determine the associated graphical object manipulation from the predefined lookup table. In this example, the graphical object manipulation corresponds to a graphical object copy and paste operation (step 208). The graphical object manipulation is then performed on the computer program icon 308, wherein the icon 308 is copied from location 308A and pasted as another computer program icon 308' to location 308B (step 210).

Figure 5B:
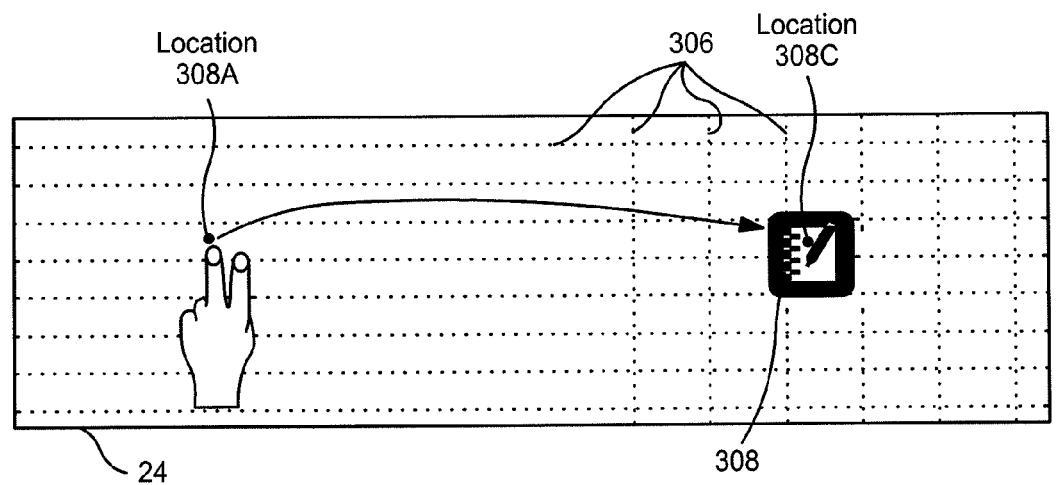

FIG. 5B illustrates an example of manipulating a computer program icon 308 displayed on the interactive surface 24 based on two fingers in contact with the interactive surface 24 according to method 200. As can be seen, a contact is made on the interactive surface 24 at the location of icon 308, identified as location 308A (step 202). In this case, the number of fingers in contact with the interactive surface 24 is determined to be two (2) (step 204). The movement of the fingers is tracked on the interactive surface 24, as illustrated by the movement of the fingers from location 308A to location 308C (step 206). The two fingers, the movement of the fingers from location 308A to location 308C and the type of graphical object contacted (a computer program icon), are used to determine the associated graphical object manipulation from the predefined lookup table. In this example, the graphical object manipulation corresponds to a graphical object move operation (step 208). The graphical object manipulation is then performed on computer program icon 308, wherein the icon 308 is moved from location 308A to location 308C (step 210).

Figure 6:
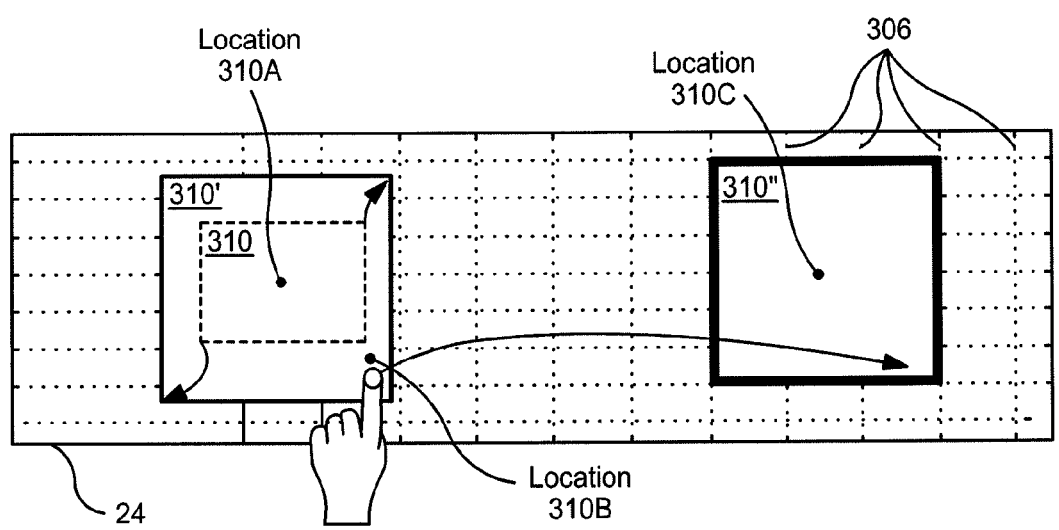
FIG. 6 shows an example of manipulating a displayed image based on two manipulations performed on the interactive surface of the interactive input system of FIG. 1.

As will be appreciated, more than one type of graphical object manipulation may be performed on a displayed graphical object. In this embodiment, in cases where multiple graphical object manipulations are to be performed, each of the manipulations is performed using method 200, as will now be described. FIG. 6 illustrates an example of manipulating an image based on two input events. As can been seen, a first contact is made on the interactive surface 24 at location 310A, corresponding to a first graphical object manipulation (step 202). In this case, the number of fingers in contact with the interactive surface 24 is determined to be two (2) (step 204). The movement of the fingers is tracked on the interactive surface 24 until a contact up event is detected on one or both fingers (step 206). In this example, the two fingers are moved away from one another. The two (2) fingers, the movement of the fingers away from one another and the type of graphical object contacted (an image), are used to determine the associated graphical object manipulation from the predefined lookup table. In this example, the graphical object manipulation corresponds to a zoom in operation (step 208). The first manipulation is then performed on the image 310 to form image 310' (step 210).

If at step 206 the user removes one of the fingers, then the first manipulation is performed, after which the method 200 proceeds to step 202 and the finger still in contact with the interactive surface 24 is treated as a new contact made on the interactive surface 24, corresponding to a second manipulation. Otherwise, if at step 206 the user removes both of the fingers, then the first manipulation is performed, after which the method 200 proceeds to step 202 and waits for a new contact to be made on the interactive surface 24.

In the example shown in FIG. 6, the user has removed one finger (not shown) from the interactive surface 24, resulting in completion of the first manipulation but has maintained the other finger in contact with the interactive surface 24. As mentioned above, by maintaining the second finger in contact with the interactive surface, the second finger is treated as a new contact made on the interactive surface 24. As can be seen in FIG. 6, the new contact is made on the interactive surface 24 at location 310B on image 310', corresponding to a second manipulation (step 202). In this case, the number of fingers in contact with the interactive surface 24 is determined to be one (1) (step 204). The movement of the finger is tracked on the interactive surface 24, from location 310B to location 310C (step 206). The single finger, the movement of the finger from location 310B to location 310C and the type of graphical object contacted (an image) are used to determine the associated graphical object manipulation from the predefined lookup table. In this example, the graphical object manipulation corresponds to a graphical object moving with snap to grid operation (step 208), the grid being identified by reference numeral 306. The second manipulation is then performed on the image 310', which is moved from location 302b and snapped to the grid at location 310C, as identified by image 310" in FIG. 6 (step 210). As can be seen, image 310" is scaled such that the boundaries of image 310" are aligned with grid 306.

Figure 7A:
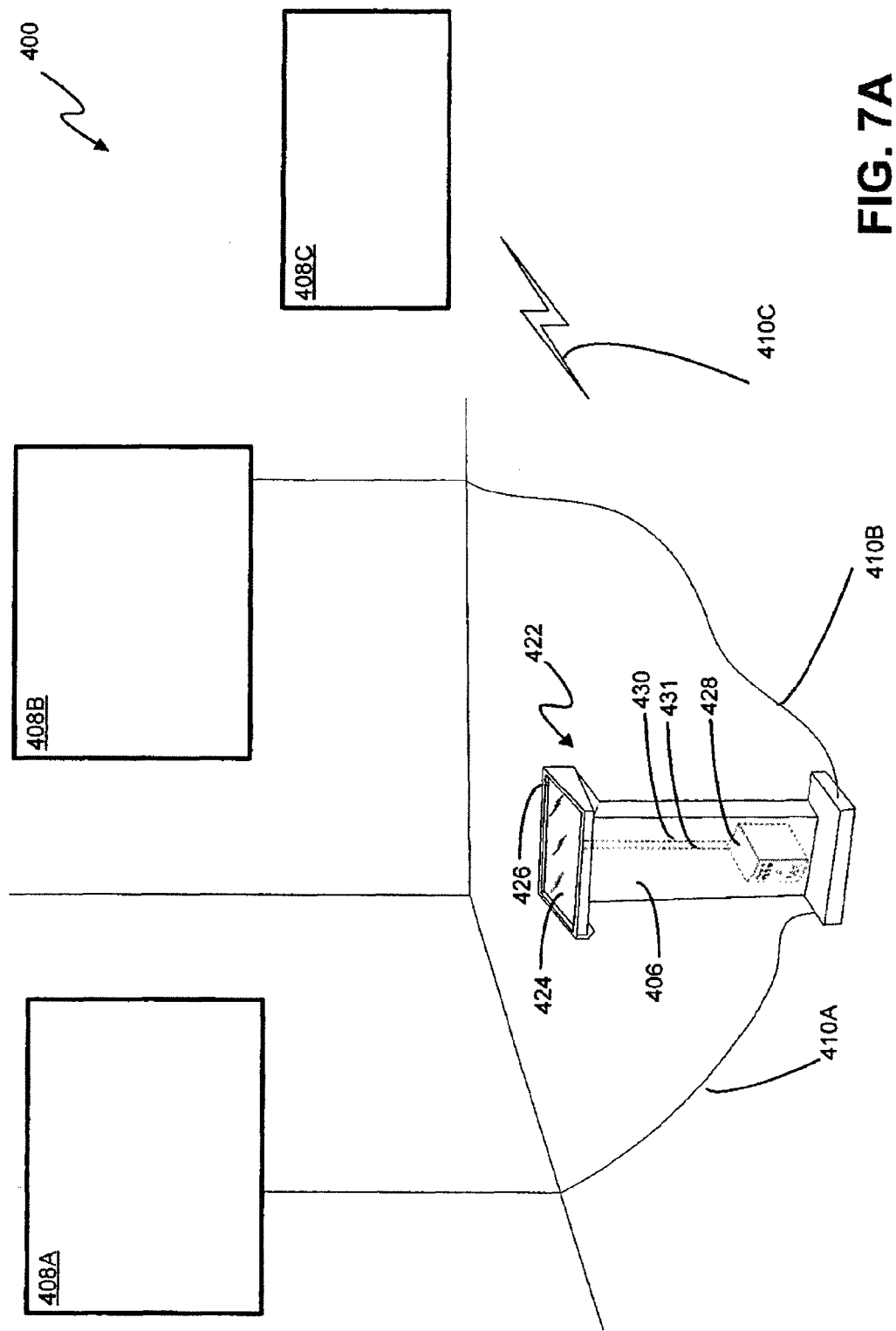
FIG. 7A is a perspective view of another embodiment of an interactive input system.

Turning now to FIG. 7A, another embodiment of an interactive input system is shown and is generally identified by reference numeral 400. Interactive input system 400 allows one or more users to inject input such as digital ink, mouse events, commands, etc., into an executing application program. In this embodiment, interactive input system 400 comprises an interactive device 422 mounted on a lectern or a podium 406. The interactive device 422 comprises a two-dimensional (2D) interactive surface 424. In this embodiment, the interactive surface 424 is surrounded by a bezel or frame 426 and is coupled to a general purpose computing device 428, which is mounted within the podium 406. The general purpose computing device 428 is also coupled to display panels 408A, 408B and 408C.

Figure 7B:
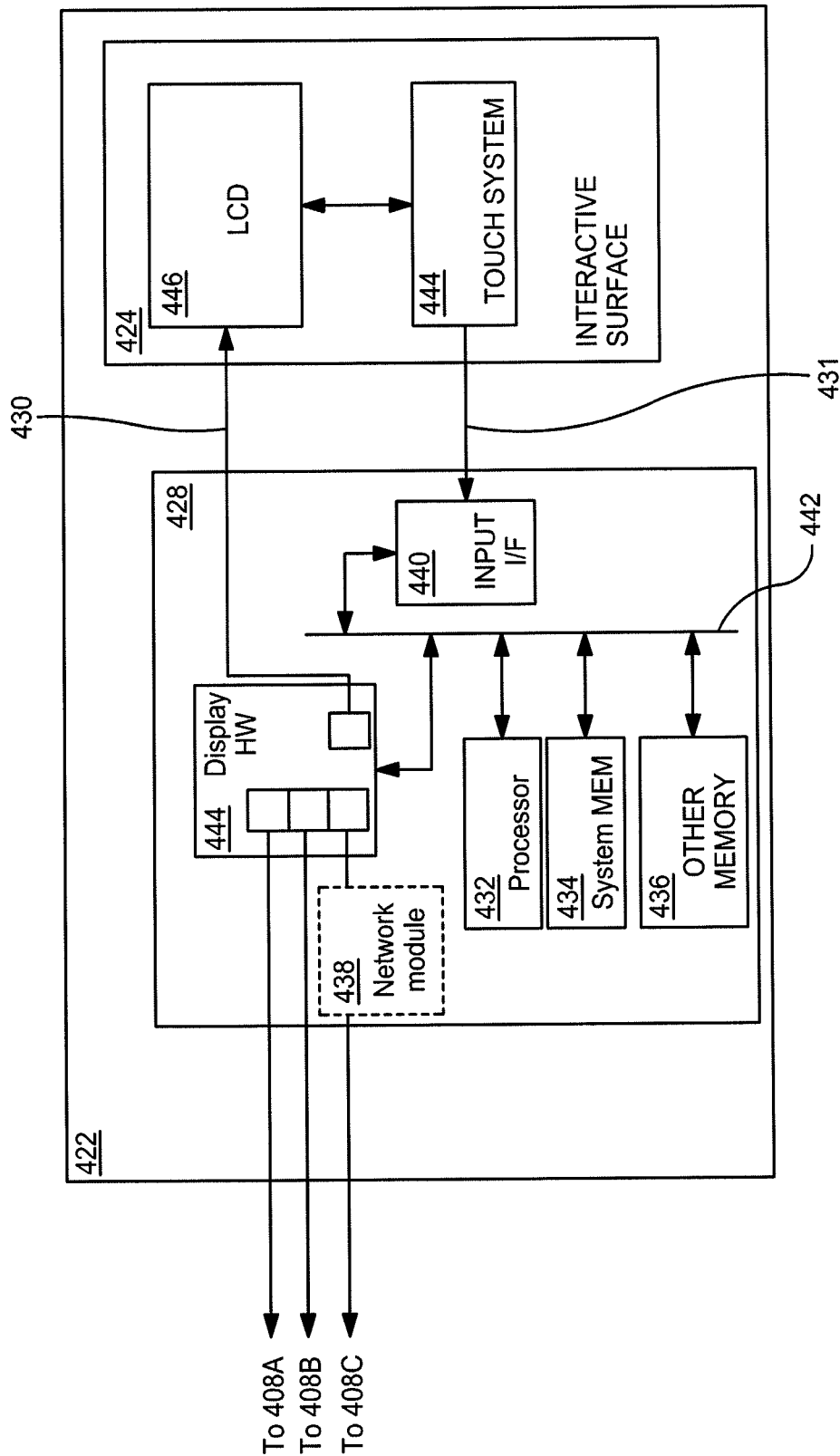
FIG. 7B is a block diagram of the interactive input system of FIG. 7A.

A block diagram of the interactive device 422 is shown in FIG. 7B. As can be seen, interactive surface 424 comprises a display panel 446, and a touch system 444 for detecting touch input. The interactive surface 424 is responsive to pointer interaction allowing pointers to contact the interactive surface 424 and be detected. In this embodiment, display panel 446 is a liquid crystal display (LCD) panel. Other types of display panels may be used such as for example a cathode ray tube (CRT), rear projection, or plasma display panel. Touch system 444 utilizes machine vision technology to register pointer interaction with the interactive surface 424 as disclosed for example, in above-incorporated U.S. Pat. Nos. 6,803,906; 7,232,986; 7,236,162; and 7,274,356 and U.S. Patent Application Publication No. 2004/0179001. Of course other technologies such as capacitive, resistive, surface acoustic wave and the like may alternately be used for touch detection by touch system 444.

Interactive surface 424 communicates with general purpose computing device 428 executing one or more application programs via one or more communication links such as a universal serial bus (USB) communication link 431 over which touch input data is communicated, and a display communication link 430 such as for example DVI, HDMI, VGA, Displayport over which display image data is communicated. Of course, other suitable wired or wireless communication links may also be used.

General purpose computing device 428 in this embodiment is a personal computer or other suitable processing device comprising, for example, a processing unit 432, system memory 434 (volatile and/or non-volatile memory), other non-removable or removable memory 436 (e.g., a hard disk drive, RAM, ROM, EEPROM, CD-ROM, DVD, flash memory, etc.), a network module 438, input/output interface 440, display hardware 444 for providing image data to interactive surface 424 and display panels 408A to 408C, and a system bus 442 coupling the various components to the processing unit 432. General purpose computing device 428 processes pointer data received from interactive surface 424 similarly to general purpose computing device 28 to compute pointer locations as well as to determine pointer types.

Display hardware 444 is capable of providing image data to multiple monitors simultaneously. Display hardware 444 comprises frame buffers allocated to each of its display output interfaces. As will be appreciated, it is known to use a modern graphics adapter (and associated drivers) having at least two display outputs that could be connected individually to display monitors, to provide one 'extended desktop', or alternatively to provide a 'clone view' to display the same image on two or more display monitors.

Network module 438 is in the form of an internal or external network adapter (with associated drivers and other software), having networking capabilities using Ethernet, WiFi, Bluetooth, and/or other suitable network format to enable connection to shared or remote drives, one or more networked computers, or other networked devices.

As noted above, the general purpose computing device 428 is coupled to three (3) display panels 408A, 408B and 408C. In this embodiment, display panels 408A, 408B and 408C are each in the form of an LCD panel coupled to the general purpose computing device 428 via communication links 410A, 410B and 410C, respectively. Communication links 410A and 410B are DVI cables, and communication link 410C is in the form of a wireless communication link coupled to a network module 438 for communicating the display image data as encoded network packets compliant with protocols such as for example Bluetooth. A corresponding decoder (not shown) is coupled to display panel 408C to receive and decode the encoded network packets (transmitted by the network module 438) as display image data. As will be appreciated, communication links 410A, 410B and 410C may of course be other suitable wired or wireless communication links, and may encapsulate display data in a networking protocol, using corresponding encoders/decoders.

The general purpose computing device 428 provides image data to the display panels 408A to 408C for display thereon. As will be appreciated, each of the display panels 408A to 408C may display the same image, or different images with respect to one another.

Figure 8:
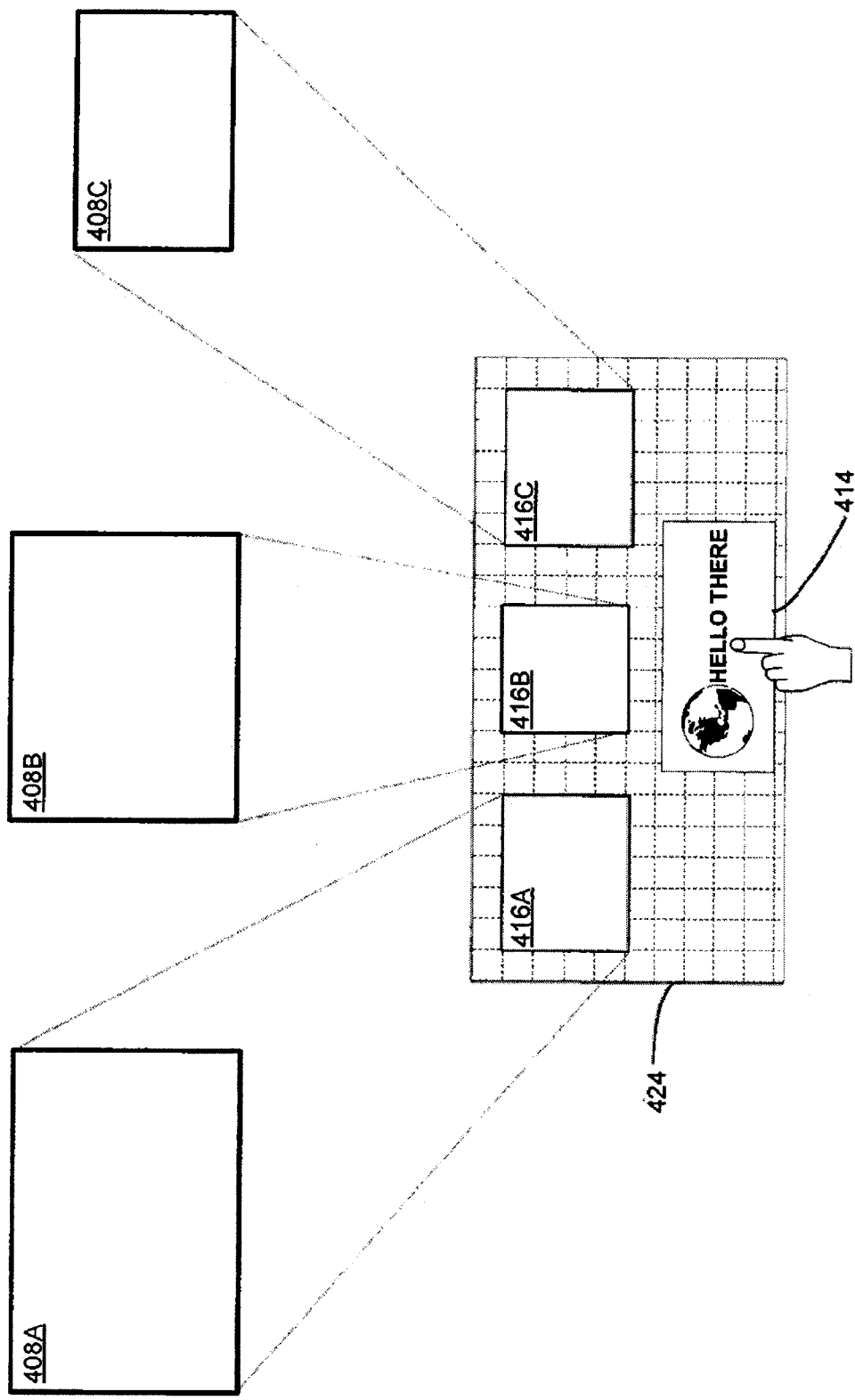
FIG. 8 is a block diagram showing an interactive surface of the interactive input system of FIG. 7A.

Interactive device 422 is used to control the information displayed on each of the display panels 408A to 408C. The general purpose computing device 428 provides the interactive surface 424 with image data representing a small scale representation of the image data provided to each of the display panels 408A to 408C, hereinafter referred to as display image areas 416A to 416C, as shown in FIG. 8. Any graphical objects, such as for example image 414, placed within the display image areas 416A to 416C via user manipulation on the interactive surface 424 are thus displayed on the respective display panels 408A to 408C. Software executing on general purpose computing device 428 has a similar architecture to that shown in FIG. 2, and further comprises a device driver for display hardware 444.

As one or more pointers contact the interactive surface 424, associated input events are generated. The input events are generated from the time the one or more pointers contact the interactive surface 424 (referred to as a contact down event) until the time the one or more pointers is lifted out of contact with the interactive surface 424 (referred to as a contact up event).

The generated input events are received by an input interface of the general purpose computing device 428, which are processed therein to retrieve the associated IDs (input IDs, surface IDs and contact IDs). When an input event is received by the input interface, the input interface communicates the input event and the associated IDs to an application program of the general purpose computing device 428. The input event is in turn processed by the application program based on the number of contact IDs associated therewith.

Interactive input system 400 utilizes methods 150 and 200 described above to manipulate a graphical object based on the number of contact IDs received by the input interface 102, wherein each contact described is a finger contacting the interactive surface 424.

An exemplary type of manipulation performed on interactive surface 424 is moving an image from a position on the home screen to one of the display image areas. As one skilled in the art will appreciate, when an image is moved to a display image area such as display image area 416A, the image may be automatically resized such that the image is fitted to the display image area 416A. Sometimes this is helpful to the user, but at other times it is not desired. An example of using method 200 to move an image with and without automatic resizing will now be described.

Figure 9B:
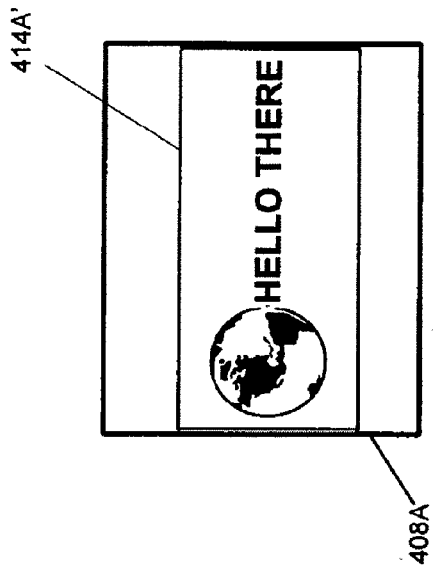
FIGS. 9A and 9B show an example of manipulating a displayed image using a single finger in contact with the interactive surface of the interactive input system of FIG. 7A.
Figure 9A:
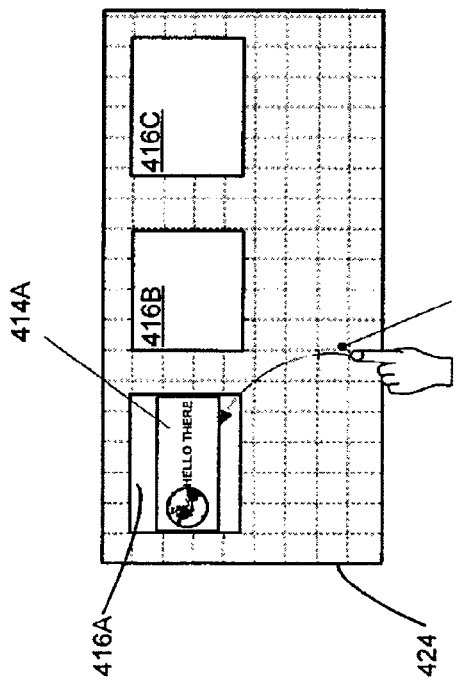

FIGS. 9A and 9B illustrate an example of manipulating the image 414 using a single finger in contact with the interactive surface 424 according to method 200. As can be seen, a contact is made on the interactive surface 424 at location 418 (step 202). In this case, the number of fingers in contact with the interactive surface 424 is determined to be one (1) (step 204). The movement of the finger is tracked on the interactive surface 424, as illustrated by the movement of the finger from location 418 to a location within display image area 416A (step 206). The single finger, the movement of the finger from location 418 to display image area 416A and the type of graphical object contacted (an image) are used to determine the associated graphical object manipulation from the predefined lookup table. In this example, the graphical object manipulation corresponds to a graphical object moving with resizing operation (step 208). The manipulation is then performed on image 414, whereby image 414 is moved into display image area 416A and resized to fit within the display image area 416A, as identified by image 414A (step 210). The resized image 414A is further resized to match the dimensions of display panel 408A, and is accordingly displayed on display panel 408A as image 414A', shown in FIG. 9B.

Figure 10B:
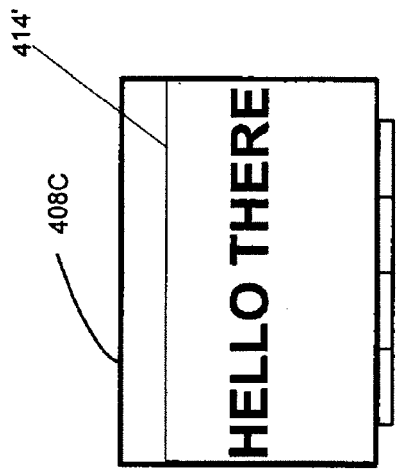
FIGS. 10A and 10B show an example of manipulating a displayed image using two fingers in contact with the interactive surface of the interactive input system of FIG. 7A.
Figure 10A:
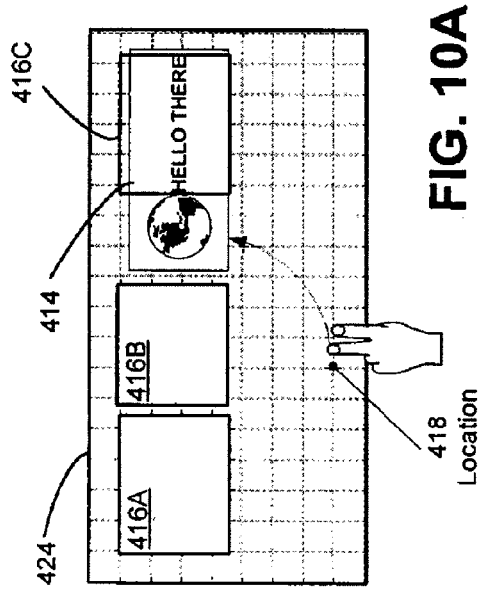

FIGS. 10A and 10B illustrate an example of manipulating the image 414 using two fingers in contact with the interactive surface 424 according to method 200. As can be seen, a contact is made on the interactive surface 424 at location 418 (step 202). In this case, the number of fingers in contact with the interactive surface 424 is determined to be two (2) (step 204). The movement of the fingers is tracked on the interactive surface 424, as illustrated by the movement of the fingers from location 418 to a location within display image area 416C (step 206). The two fingers, the movement of the fingers from location 418 to display image area 416C, and the type of graphical object contacted (an image) are used to determine the associated graphical object manipulation from the predefined lookup table. In this example, the graphical object manipulation corresponds to a graphical object moving without resizing operation (step 208). The manipulation is then performed on image 414, whereby image 414 is moved so as to overlap display image area 416C without being resized, and such that only a portion of image 414 is contained within display image area 416C (step 210). The portion of the image 414 that is contained within display image area 416C is displayed on display panel 408C as image 414', as shown in FIG. 10B.

Although the display panels 408A to 408C are described as LCD display panels, those skilled in the art will appreciate that the display panels 408A to 408C may be any type of device capable of displaying image data such as for example plasma display panels, cathode ray tube (CRT) televisions, etc. Further, the display panels may be IWBs of the type described above with respect to IWB 22 or other types of interactive input systems. In another embodiment, the display panels 408A to 408C may be different types of display devices. For example, display panel 408A may an IWB, display panel 408B may be an LCD device, and display panel 408C may be a plasma display panel.

Although various types of manipulations are described in embodiments above, those skilled in the art will appreciate that any type of manipulation may be input into the predefined lookup table for manipulation of a graphical object such as for example moving, moving with snap, moving with resizing, copy and pasting, resizing, maximizing, minimizing, cropping, rotating, selecting, deleting, etc.

Although the lookup table is described as being predefined those skilled in the art will appreciate that the lookup table may be edited, redefined, or changed by a user at any time.

Although contacts are described as being made by a user's finger or fingers, those skilled in the art will appreciate that other types of pointers may be used to contact the interactive surface such as for example a cylinder or other suitable object, a pen tool or an eraser tool lifted from a receptacle of the tool tray.

Further, a user may wear gloves that have identifiable characteristics associated therewith such a fingertips with a unique shape, color, barcode, contact surface area, wavelength, etc. In this embodiment, different fingers may be used to perform different gestures. For example, an index finger may be used to perform a first manipulation, and a middle finger may be used to perform a second manipulation.

In another embodiment, finger movements may be tracked across two or more interactive surfaces forming part of a single IWB. In this embodiment, finger movements may be tracked similar to that described in U.S. Patent Application Publication No. 2005/0259084 to Popovich, et al., entitled "TILED TOUCH SYSTEM", assigned to SMART Technologies ULC, the content of which is incorporated herein by reference in its entirety.

In this embodiment, a finger may be used to drag a graphical object on an IWB having horizontally tiled interactive surfaces. For example, the IWB may have a left interactive surface and a right interactive surface separated by a gap. In the event a finger contacts a graphical object displayed on the left interactive surface, and begins movement to perform a left-to-right horizontal drag operation to move the graphical object from the left interactive surface to the right interactive surface, the movement of the finger is tracked from the left interactive surface, through the gap, to the right interactive surface. When the finger reaches the gap, the graphical object remains at the rightmost edge of the left surface. As the finger continues to move along the gap, it is tracked vertically along the right edge of the left interactive surface. When the finger reaches the mid-point of the gap, the graphical object flips to the left edge of the right interactive surface and remains in this position until the pointer has completed moving along the gap. The graphical object however may move vertically along to track the finger. When the finger reaches the right interactive surface, the graphical object resumes tracking the finger along both the horizontal and vertical axis as the finger moves across the right interactive surface. A similar process is performed if a vertical drag operation is performed on an IWB having vertically tiled interactive surfaces.

Although in embodiments described above, the IWB comprises one interactive surface, in other embodiments, the IWB may alternatively comprise two or more interactive surfaces, and/or two or more interactive surface areas. In this embodiment, each interactive surface, or each interactive surface area, has a unique surface ID. IWBs comprising two interactive surfaces on the same side thereof have been previously described in U.S. Patent Application Publication No. 2011/0043480 to Popovich, et al., entitled "MULTIPLE INPUT ANALOG RESISTIVE TOUCH PANEL AND METHOD OF MAKING SAME", assigned to SMART Technologies ULC, the content of which is incorporated herein by reference in its entirety.

The application program may comprise program modules including routines, programs, object components, data structures, and the like, and may be embodied as computer readable program code stored on a non-transitory computer readable medium. The computer readable medium is any data storage device that can store data. Examples of computer readable media include for example read-only memory, random-access memory, CD-ROMs, magnetic tape, USB keys, flash drives and optical data storage devices. The computer readable program code can also be distributed over a network including coupled computer systems so that the computer readable program code is stored and executed in a distributed fashion.

Although in embodiments described above, the IWB is described as comprising machine vision to register pointer input, those skilled in the art will appreciate that other interactive boards employing other machine vision configurations, analog resistive, electromagnetic, capacitive, acoustic or other technologies to register input may be employed.

For example, products and touch systems may be employed such as for example: LCD screens with camera based touch detection (for example SMART Board™ Interactive Display—model 8070i); projector based IWB employing analog resistive detection (for example SMART Board™ IWB Model 640); projector based IWB employing a surface acoustic wave (WAV); projector based IWB employing capacitive touch detection; projector based IWB employing camera based detection (for example SMART Board™ model SBX885ix); table (for example SMART Table™—such as that described in U.S. Patent Application Publication No. 2011/069019 assigned to SMART Technologies ULC, the entire contents of which are incorporated herein by reference); slate computers (for example SMART Slate™ Wireless Slate Model WS200); podium-like products (for example SMART Podium™ Interactive Pen Display) adapted to detect passive touch (for example fingers, pointer, etc.,—in addition to or instead of active pens); all of which are provided by SMART Technologies ULC.

Other types of products that utilize touch interfaces such as for example tablets, smart-phones with capacitive touch surfaces, flat panels having touch screens, IWBs, a track pad, and the like may also be employed.

Although embodiments have been described above with reference to the accompanying drawings, those of skill in the art will appreciate that variations and modifications may be made without departing from the scope thereof as defined by the appended claims.

What is claimed is:

1. A method comprising:
generating, by an interactive device that communicates with and controls information displayed on at least one remote display device, an input event in response to an input received from one of a mouse, keyboard, or interactive surface, wherein the input event is defined by an input ID identifying the input source, a surface ID identifying an interactive surface on which a pointer input is received and a contact ID distinguishing between multiple simultaneous contacts;
in response to determining the input event corresponds to one of a mouse or keyboard input, setting the surface ID and the contact ID to a default value;
determining an input contact down event in response to at least one contact made on an interactive surface of the interactive device, the interactive surface having at least one region representative of the at least one display device;
determining if the at least one contact made on the interactive surface of the interactive device corresponds to a location of a graphical object displayed on the interactive surface;
processing, in response to determining the at least one contact on the interactive surface does not correspond to a location of the graphical object, the contact as a writing, drawing or command to control the execution of an application program; and
processing, in response to determining the at least one contact on the interactive surface does correspond to a location of the graphical object, the contact as a manipulation of the graphical object by:
determining the number of contacts associated with the input contact down event;
tracking movement of the at least one contact on the interactive surface; and
in response to a subsequent contact up event:
identifying a graphical object manipulation based on the number of contacts, the movement of the at least one contact, whether the graphical object is manipulated such that the graphical object, at least partially, overlaps with the at least one region, and the graphical object type;
performing the identified graphical object manipulation on the graphical object, the manipulation being done relative to the at least one region; and
displaying only a portion of the manipulated graphical object on the at least one display device in the event that the manipulated graphical object overlaps, only partially, with the at least one region, the portion of the manipulated graphical object displayed on the at least one display device corresponding to the portion of the manipulated graphical object that overlaps with the at least one region.

2. The method of claim 1 wherein the at least one contact is made by at least one finger.

3. The method of claim 1 wherein identifying the graphical user object manipulation comprises examining a lookup table to identify the graphical object manipulation.

4. The method of claim 3 wherein the lookup table is customizable by a user.

5. The method of claim 1 wherein the graphical object type is one of a computer program icon, an image, and a window.

6. The method of claim 5 wherein when the graphical object type is the computer program icon, the graphical object manipulation is one of a graphical object moving manipulation and a graphical object copy and paste manipulation.

7. The method of claim 5 wherein when the graphical object type is the image, the graphical object manipulation is one of a graphical object moving manipulation, a graphical object moving with snap manipulation, a graphical object moving with resizing manipulation, a graphical object copy and paste manipulation, a graphical object resizing manipulation, a graphical object maximizing manipulation, a graphical object minimizing manipulation, a graphical object cropping manipulation, a graphical object rotating manipulation, a graphical object selecting manipulation and a graphical object deleting manipulation.

8. The method of claim 5 wherein when the graphical object type is the window, the graphical object manipulation is one of a graphical object moving manipulation, a graphical object resizing manipulation, a graphical object maximizing manipulation, a graphical object minimizing manipulation and a graphical object closing manipulation.

9. The method of claim 1 wherein said interactive surface comprises a plurality of regions, each region representative of a respective display device and wherein during the displaying, in the event that the manipulated graphical object overlaps, only partially, with one of said regions, the portion of the manipulated graphical object is displayed on the respective display device associated with the one region.

10. The method of claim 9 wherein the at least one contact is made by at least one finger.

11. The method of claim 9 wherein identifying the graphical user object manipulation comprises examining a lookup table to identify the graphical object manipulation.

12. The method of claim 11 wherein the lookup table is customizable by a user.

13. The method of claim 9 wherein the graphical object type is one of a computer program icon, an image, and a window.

14. The method of claim 13 wherein when the graphical object type is the computer program icon, the graphical object manipulation is one of a graphical object moving manipulation and a graphical object copy and paste manipulation.

15. The method of claim 13 wherein when the graphical object type is the image, the graphical object manipulation is one of a graphical object moving manipulation, a graphical object moving with snap manipulation, a graphical object moving with resizing manipulation, a graphical object copy and paste manipulation, a graphical object resizing manipulation, a graphical object maximizing manipulation, a graphical object minimizing manipulation, a graphical object cropping manipulation, a graphical object rotating manipulation, a graphical object selecting manipulation and a graphical object deleting manipulation.

16. The method of claim 13 wherein when the graphical object type is the window, the graphical object manipulation is one of a graphical object moving manipulation, a graphical object resizing manipulation, a graphical object maximizing manipulation, a graphical object minimizing manipulation and a graphical object closing manipulation.

17. The method of claim 1 wherein the default value is null.

18. An interactive input system comprising:
a plurality of display devices;
an interactive device configured to communicate with said display devices and control information presented on said display devices, said interactive device comprising an interactive surface having a plurality of regions, each region representative of a respective one of said display devices; and
processing structure configured to:
receive an input event in response to an input received from one of a mouse, keyboard, or interactive surface, wherein the input event is defined by an input ID identifying the input source, a surface ID identifying an interactive surface on which a pointer input is received and a contact ID distinguishing between multiple simultaneous contacts;
in response to determining the input event corresponds to one of a mouse or keyboard input, set the surface ID and the contact ID to a default value;
determine an input contact down event generated by the interactive device when at least one contact is made on the interactive surface in response to said input contact down event determine if the at least one contact made on the interactive surface corresponds to a location of a graphical object displayed on the interactive surface,
process, in response to a determination that the at least one contact on the interactive surface does not correspond to a location of the graphical object, the contact as a writing, drawing or command to control the execution of an application program, and
in response to a determination that the at least one contact on the interactive surface does correspond to a location of the graphical object,
determine a number of contacts associated with the input contact down event,
track movement of the at least one contact on the interactive surface,
in response to a subsequent contact up event:
identify a graphical object manipulation based on the number of contacts, the movement of the at least one contact, whether the graphical object is manipulated such that the graphical object, at least partially, overlaps with one of said regions, and the graphical object type,
perform the identified graphical object manipulation, the manipulation being done relative to the one region, and
in the event that said manipulated graphical object overlaps, only partially, with the region, display only a portion of the manipulated graphical object on the respective display device associated with the one region, the portion of the manipulated graphical object displayed on the respective display device corresponding to the portion of the manipulated graphical object that overlaps with the one region.

19. The interactive input system of claim 18 wherein the processing structure examines a lookup table to identify the graphical object manipulation.

20. The interactive input system of claim 18 wherein the at least one contact is made by at least one finger.

21. The interactive input system of claim 18 wherein the graphical object type is one of a computer program icon, an image, and a window.

22. The interactive input system of claim 21 wherein when the graphical object type is the computer program icon, the graphical object manipulation is one of a graphical object moving manipulation and a graphical object copy and paste manipulation.

23. The interactive input system of claim 21 wherein when the graphical object type is the image, the graphical object manipulation is one of a graphical object moving manipulation, a graphical object moving with snap manipulation, a graphical object moving with resizing manipulation, a graphical object copy and paste manipulation, a graphical object resizing manipulation, a graphical object maximizing manipulation, a graphical object minimizing manipulation, a graphical object cropping manipulation, a graphical object rotating manipulation, a graphical object selecting manipulation and a graphical object deleting manipulation.

24. The interactive input system of claim 21 wherein when the graphical object type is the window, the graphical object manipulation is one of a graphical object moving manipulation, a graphical object resizing manipulation, a graphical object maximizing manipulation, a graphical object minimizing manipulation and a graphical object closing manipulation.

25. The interactive input system of claim 18 wherein the default value is null.

26. A non-transitory computer readable medium embodying a computer program for execution by a computer, the computer program comprising:
program code for receiving an input event in response to an input received from one of a mouse, keyboard, or interactive surface, wherein the input event is defined by an input ID identifying the input source, a surface ID identifying an interactive surface on which a pointer input is received and a contact ID distinguishing between multiple simultaneous contacts;

program code for setting, in response to determining the input event corresponds to one of a mouse or keyboard input, the surface ID and the contact ID to a default value;

program code for determining an input contact down event generated by an interactive device that communicates with and controls information displayed on at least one display device when at least one contact is made on an interactive surface of the interactive device, the interactive surface having at least one region representative of the at least one display device;

program code for determining if the at least one contact made on the interactive surface of the interactive device corresponds to a location of a graphical object displayed on the interactive surface;

in response to determining the at least one contact on the interactive surface does not correspond to a location of the graphical object, program code for processing the contact as a writing, drawing or command to control the execution of an application program;

program code for determining the number of contacts associated with the input contact down event in response to determining that the at least one contact on the interactive surface does correspond to a location of the graphical object;

program code for tracking movement of the at least one contact on the interactive surface; and in response to a subsequent contact up event detected after determining the at least one contact on the interactive surface does correspond to a location of the graphical object:
  program code for identifying a graphical object manipulation based on the number of contacts, the movement of the at least one contact, whether the graphical object is manipulated such that the graphical object, at least partially, overlaps with the at least one region, and the graphical object type;
  program code for performing the identified graphical object manipulation, the manipulation being done relative to the at least one region; and
  program code for displaying only a portion of the manipulated graphical object on the at least one display device in the event that said manipulated graphical object overlaps, only partially, with the at least one region, the portion of the manipulated graphical object displayed on the at least one display device corresponding to the portion of the manipulated graphical object that overlaps with the at least one region.

27. An apparatus comprising:
a plurality of display devices;
an interactive device configured to communicate with said display devices and control information presented on said display devices, said interactive device comprising an interactive surface having a plurality of regions, each region representative of a respective one of said display devices;
memory storing program instructions; and
one or more processors communicating with said memory, interactive device and display devices, said one or more processors, in response to execution of said program instructions, being configured to cause said apparatus to:
  receive an input event in response to an input received from one of a mouse, keyboard, or interactive surface, wherein the input event is defined by an input ID identifying the input source, a surface ID identifying an interactive surface on which a pointer input is received and a contact ID distinguishing between multiple simultaneous contacts;
  in response to determining the input event corresponds to one of a mouse or keyboard input, set the surface ID and the contact ID to a default value;
  determine an input contact down event generated by said interactive device when at least one contact is made on the interactive surface;
  determine if the at least one contact made on the interactive surface of the interactive device corresponds to a location of a graphical object displayed on the interactive surface;
  process, in response to determining the at least one contact on the interactive surface does not correspond to a location of the graphical object, the contact as a writing, drawing or command to control the execution of an application program; and
  in response to said input contact down event after determining the at least one contact on the interactive surface does correspond to a location of the graphical object:
    determine a number of contacts associated with the input contact down event;
    track movement of the at least one contact on the interactive surface; and
    in response to a subsequent contact up event:
      identify a graphical object manipulation based on the number of contacts, the movement of the at least one contact, whether the graphical object is manipulated such that the graphical object, at least partially, overlaps with one of said regions, and the graphical object type;
      perform the identified graphical object manipulation, the manipulation being done relative to the one region; and
      in the event that said manipulated graphical object overlaps, only partially, with the one region, display only a portion of the manipulated graphical object on the respective display associated with the one region, the portion of the manipulated graphical object displayed on the respective display device corresponding to the portion of the manipulated graphical object that overlaps with the one region;
      determining if the at least one contact made on the interactive surface of the interactive device corresponds to a location of a graphical object displayed on the interactive surface.

28. The apparatus of claim 27 wherein the one or more processors examine a lookup table to identify the graphical object manipulation.

29. The apparatus of claim 27 wherein the at least one contact is made by at least one finger.

30. The apparatus of claim 27 wherein the graphical object type is one of a computer program icon, an image, and a window.

31. The apparatus of claim 30 wherein when the graphical object type is the computer program icon, the graphical object manipulation is one of a graphical object moving manipulation and a graphical object copy and paste manipulation.

32. The apparatus of claim 30 wherein when the graphical object type is the image, the graphical object manipulation is one of a graphical object moving manipulation, a graphical object moving with snap manipulation, a graphical object moving with resizing manipulation, a graphical object copy and paste manipulation, a graphical object resizing manipulation, a graphical object maximizing manipulation, a graphical object minimizing manipulation, a graphical object cropping manipulation, a graphical object rotating manipulation, a graphical object selecting manipulation and a graphical object deleting manipulation.

33. The apparatus of claim 30 wherein when the graphical object type is the window, the graphical object manipulation is one of a graphical object moving manipulation, a graphical object resizing manipulation, a graphical object maximizing manipulation, a graphical object minimizing manipulation and a graphical object closing manipulation.

* * * * *